United States Patent [19]
Irwin et al.

[11] Patent Number: 5,836,527
[45] Date of Patent: Nov. 17, 1998

[54] APPARATUS FOR COMMINUTING SOLID WASTE MATERIALS

[75] Inventors: Jere F. Irwin; Gerald M. Corbin, both of Yakima, Wash.

[73] Assignee: Irwin Research & Development, Yakima, Wash.

[21] Appl. No.: 290,719

[22] PCT Filed: Jun. 6, 1994

[86] PCT No.: PCT/US94/06412

§ 371 Date: Nov. 26, 1996

§ 102(e) Date: Nov. 26, 1996

[87] PCT Pub. No.: WO95/33566

PCT Pub. Date: Dec. 14, 1995

[51] Int. Cl.$^6$ .............................. B02C 4/08; B02C 18/14
[52] U.S. Cl. .............................. 241/49; 241/61; 241/80; 241/236
[58] Field of Search .......................... 241/236, 97, 80, 241/45, 49, 52, 57, 60–62, 79, 79.1

[56] References Cited

U.S. PATENT DOCUMENTS

| | | |
|---|---|---|
| 2,595,117 | 4/1952 | Ahlmann . |
| 3,055,597 | 9/1962 | Mund . |
| 3,229,698 | 1/1966 | Johansson et al. . |
| 3,310,059 | 3/1967 | Grinzinger . |
| 3,627,211 | 12/1971 | Leach . |
| 4,134,556 | 1/1979 | Ehrlich et al. . |
| 4,687,144 | 8/1987 | Irwin et al. . |
| 5,039,020 | 8/1991 | Leuthold et al. . |
| 5,141,168 | 8/1992 | Pepper . |

*Primary Examiner*—Mark Rosenbaum
*Attorney, Agent, or Firm*—Wells, St. John, Roberts, Gregory & Matkin, P.S.

[57] ABSTRACT

A solid waste comminuting apparatus (10) for reducing solid waste material (12). The apparatus (10) has rolls (42, 44) for severing material that is fed into the entrance (32). After the material is severed, it is carried by an airstream to a fan (112). The subdivided pieces are directed to a separator screen (131) mounted within the centrifugal housing. The airstream carries the small pieces (14e) through the separator screen (131) into an outer volute chamber (135) for discharge from the apparatus. The large pieces (14a–14d) which do not pass through the separator screen (131) are recycled through a recycle outlet (143) and a recycle conduit (150) back to the rolls (42, 44) for further size reduction.

17 Claims, 9 Drawing Sheets

APPARATUS FOR COMMINUTING SOLID WASTE MATERIALS

TECHNICAL FIELD

This invention relates to apparatus for comminuting solid waste material such as plastic sheet material.

BACKGROUND ART

During the manufacture and forming of many products from plastic, significant amounts of plastic waste material is frequently produced. Applicant has previously invented a unique apparatus for comminuting waste material, particularly plastic sheet material, into small, rather uniform particles or pieces that can be readily recycled or disposed of in an environmentally acceptable manner. Such prior invention is the subject of the Irwin et al. U.S. Pat. No. 4,687,144, granted Aug. 18, 1987 and assigned to Irwin Research & Development, Inc.

Such prior invention was a vast improvement over various types of hammermills that had previously been used. The hammermills were quite bulky, extremely noisy, and prone to substantial damage when the mill received foreign material that it could not comminute. Although such prior Irwin et al. invention was a vast improvement and was commercially successful, particularly in view of hammermill, it was rather expensive to manufacture and sometimes noisy in operation when processing certain material. Furthermore, it was unable to satisfactory comminute rather high density plastic materials.

The objective of the present invention is to provide a vastly improved comminuting apparatus that is not only able to process significantly greater amounts of material in a given time, but is also less expensive to manufacture and quieter in operation. Furthermore the present invention provides an apparatus that is able to comminute a wider variety of solid waste products.

BRIEF DESCRIPTION OF THE DRAWINGS

Preferred embodiments of the invention are described below with reference to the accompanying drawings, which are briefly described below.

BEST MODES FOR CARRYING OUT THE INVENTION AND DISCLOSURE OF INVENTION

Figure 1:
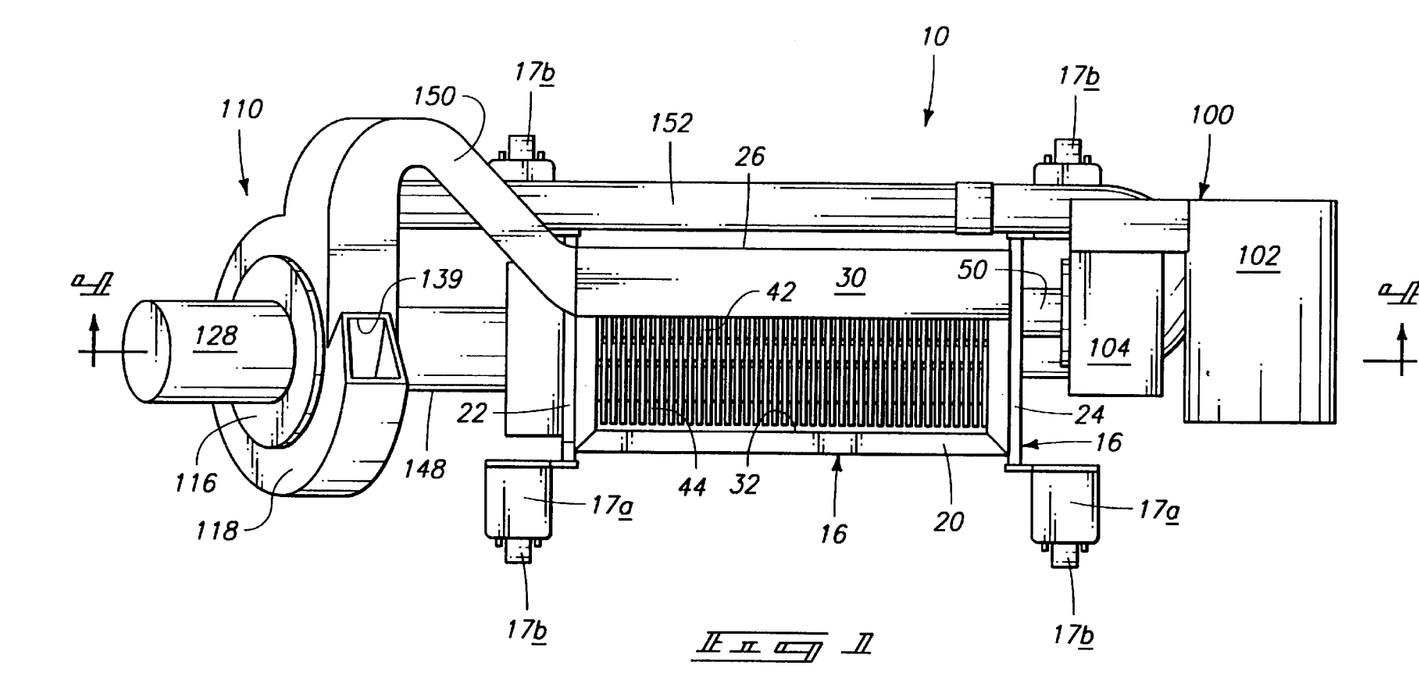
FIG. 1 is a plan view of a preferred embodiment of the apparatus illustrating the top exterior of the apparatus with a waste material entrance.
Figure 2:
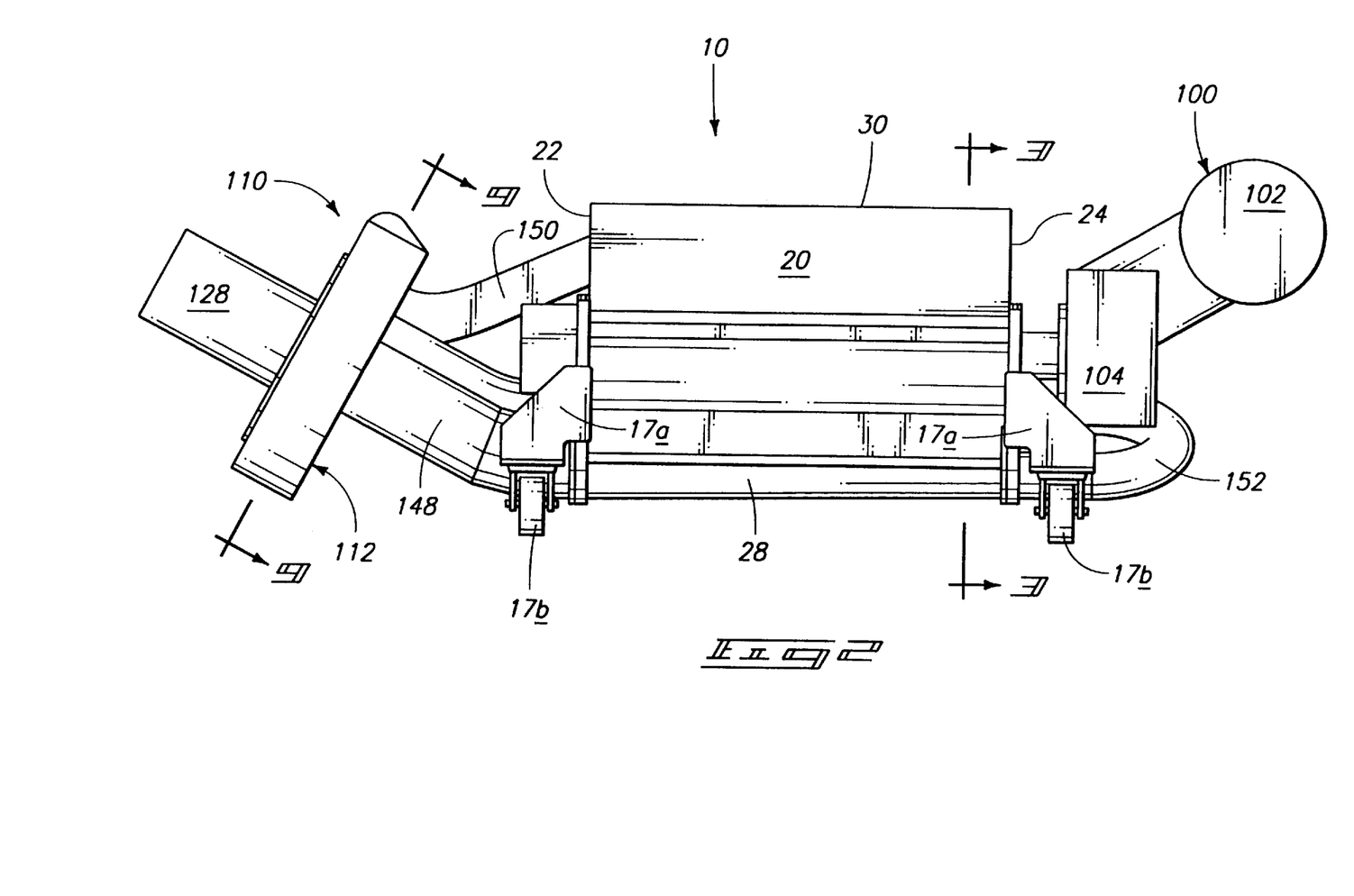
FIG. 2 is a front view of the apparatus illustrated in FIG. 1.
Figure 4:
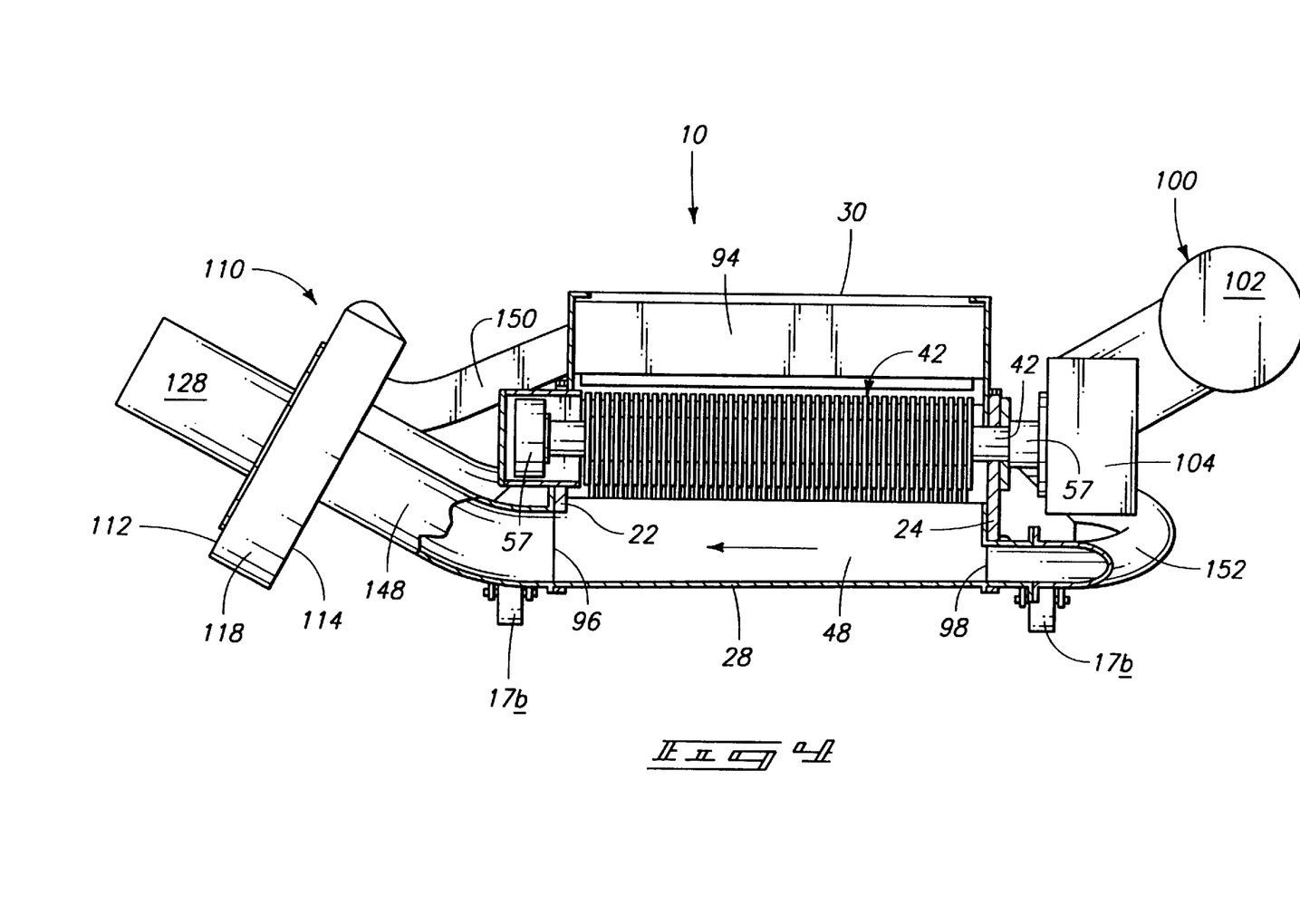
FIG. 4 is a longitudinal vertical cross-sectional view taken along line 4—4 in FIG. 1 illustrating the interior of the apparatus.
Figure 5:
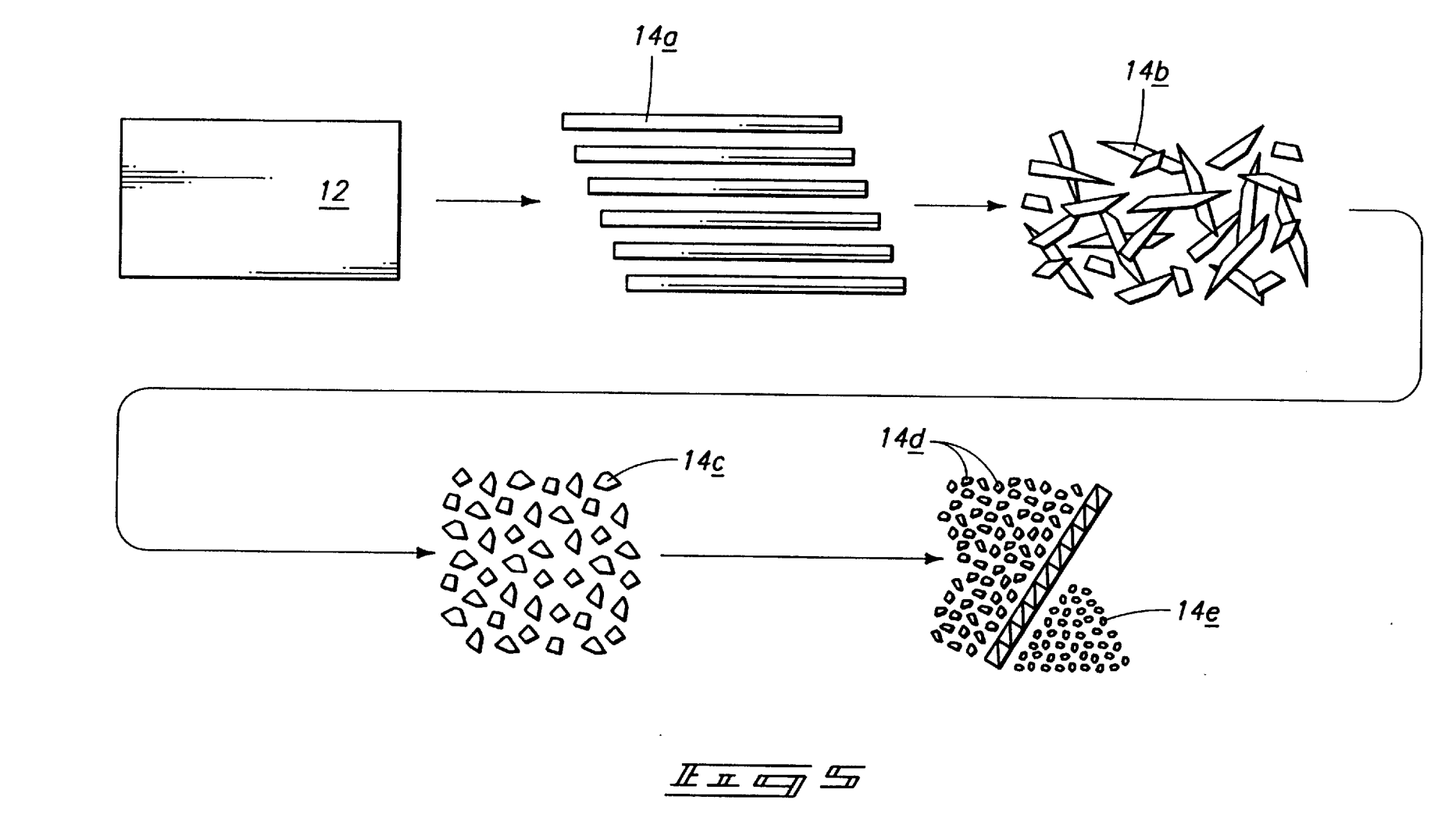
FIG. 5 is a series of illustration views of the waste material and the reduction of the waste material into smaller and smaller particles of the material is progressively processed and reduced to a desired particulate size.

A preferred embodiment of this invention is illustrated in the accompanying drawings, illustrating a waste comminuting apparatus generally designated with the numeral 10 in FIGS. 1, 2 and 4 for receiving solid waste material 12 and for reducing the solid waste material progressively into smaller and smaller sizes until a desired small particulate or piece size is obtained as illustrated in FIG. 5.

It should be noted that the apparatus 10 is very compact even through the material is progressively reduced in size in several stages to a desired predetermined small size. The predetermined small piece size will generally depend upon the desires of the customer, the end use, and the particular material being comminuted. The solid waste material 12, illustrated in FIG. 5, is progressively reduced to subdivided pieces 14a through 14e. When the subdivided pieces are finally reduced to the desired small size 14e, they are removed from the apparatus as the final product. Those subdivided pieces that have not been sufficiently reduced to the desired small size are reprocessed or recycled until they are sufficiently reduced to the desired size.

Figure 3:
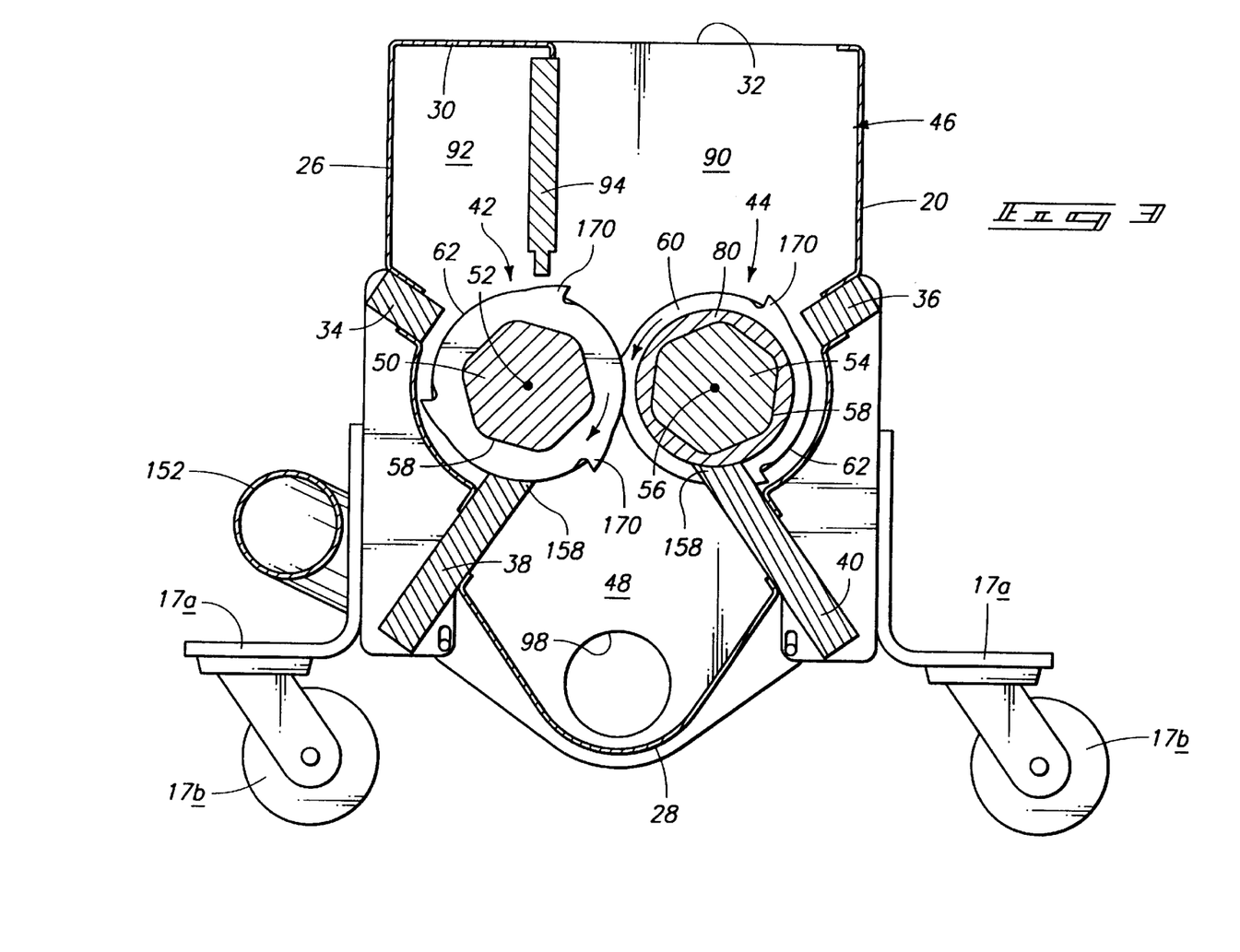
FIG. 3 is a transverse vertical cross-sectional view taken along line 3—3 in FIG. 2 illustrating the interior of the apparatus.

The apparatus 10 has a general frame 16 that may be self-supported or affixed to other apparatus such as the discharge of a thermo-forming machine for receiving the solid waste material 12 directly from a thermo-forming machine and reducing the material for reuse. The frame 16 generally includes a general enclosure 18 that includes a front wall 20, side walls 22, 24, back wall 26, a bottom wall 28 and a top wall 30. The top wall 30 has a material entrance 32 (FIGS. 1 and 3) through which the solid waste material is fed into the apparatus 10. The general frame 16 may be supported on legs 17a that have wheels 17b. The general frame 16 preferably includes upper cross-frame members 34 and 36 and lower frame members 38 and 40 that are illustrated in FIG. 3.

Within the enclosure 18, two scissor rolls 42 and 44 are mounted in an intermeshing relationship for rotation in opposite directions in coordination with each other to receive the solid waste material 12 and to shear the solid waste material as the material passes between the scissors rolls 42 and 44. The scissors rolls 42 and 44 are positioned within the enclosure 18 between an intake manifold 46 that receives the material through the entrance 32. The material, after passing through the scissor rolls descends into an outtake manifold 48 (FIG. 3).

The scissor roll 42 is mounted on a shaft 50 that rotates about axis 52. The scissor roll 44 is mounted on a shaft 54 that rotates about axis 56. Axes 52 and 56 are parallel with each other and extend between the side walls 22 and 24. The axes 52, 56 are positioned so that the scissor rolls 42, 44 have sufficient overlap to shear the material between the scissor rolls as the material passes between the rolls. The shafts 50 and 54 are supported for rotation by respective bearings 57 (FIG. 4). Each of the shafts 50 and 54 have hexagonal cross-sectional profiles, providing angular drive surfaces 58.

Figure 11:
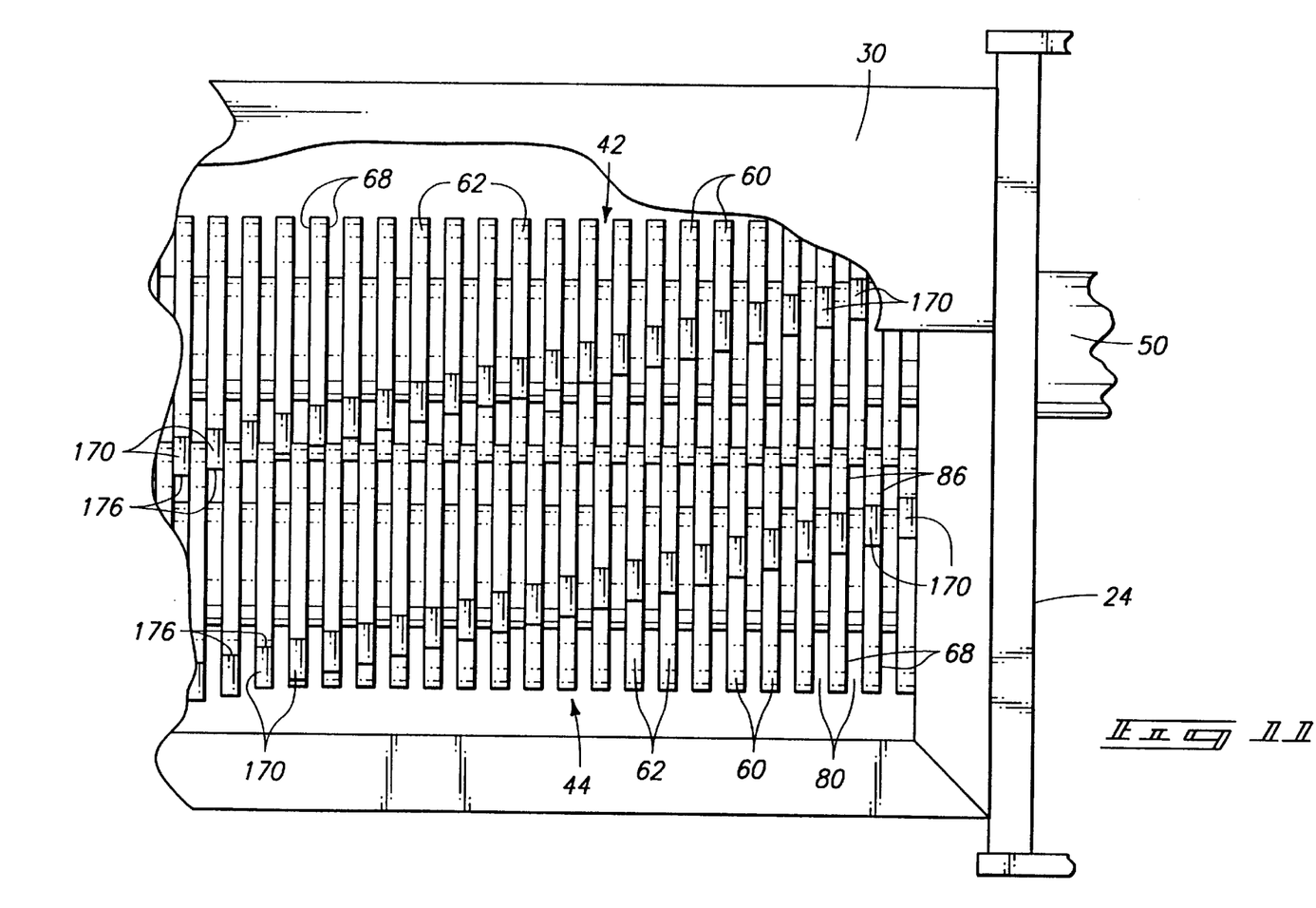
FIG. 11 is fragmentary top view with a portion of a top wall removed to illustrate scissor rolls emphasizing the location and spacing of scissor roll ring finger knives.

Each of the scissor rolls 42 and 44 include a plurality of scissor rings 60 in which each of the rings 60 has an outer circular peripheral surface 62 and an inner hexagonal bearing surface 64 that is complementary to the profile of the shafts 50 and 54 so that the scissor rings 60 rotate in response to the rotation of the shafts 50 and 54. Each of the scissor rings 60 include side surfaces that form shearing edges 68 with the outer peripheral surface 62 (FIG. 11).

Figure 7:
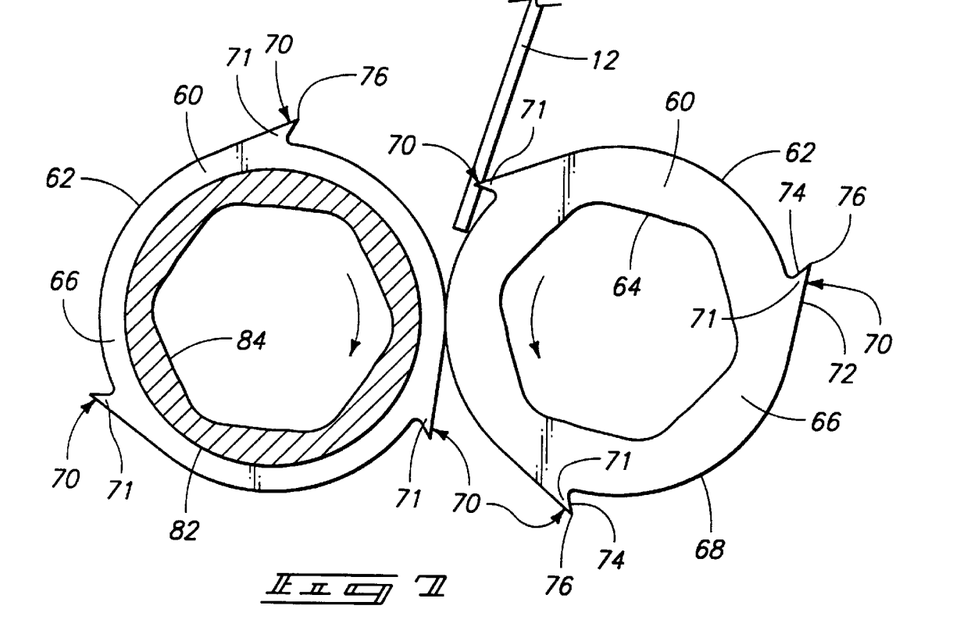
FIG. 7 is an isolated vertical cross-sectional view of a set of scissor roll rings illustrating the initial entrance of a piece of waste material between the scissor rolls.
Figure 8:
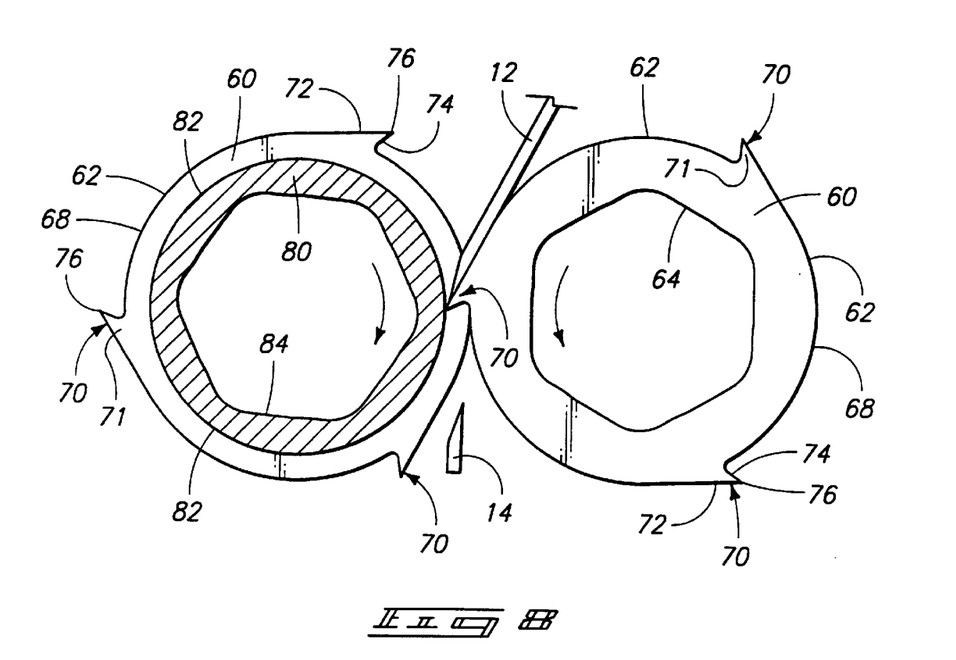
FIG. 8 is an isolated vertical cross-sectional view similar to FIG. 7 except showing the scissor roll rings incrementally rotated to sever the piece of waste material.

In the preferred embodiment, each of the scissor rings 60 have evenly angularly spaced finger knives 70 formed integrally on the scissor rings 60 and projecting radially outward of the surface 62 and forward in the direction of rotation for gripping, puncturing and transversely cutting the solid waste material 12 as illustrated in FIGS. 7 and 8. Each of the finger knives 70 include a projecting body 71 that projects radially outward from the peripheral surface 62 and projects forward in the direction of rotation. Each of the finger knives 70 includes side shearing surfaces 72 and an undercut surface 74 forming a sharp knife point 76. The scissor ring finger knives 70 are intended to grip, puncture and transversely cut each piece as it is being sheared between the rings 60.

Each of the scissor rolls 42 and 44 further include a plurality of ring spacers 80. Each spacer 80 has a circular outer peripheral surface 82 and an inner hexagonal surface 84 (FIGS. 7 and 8). Each of the ring spacers 80 have a width that is slightly greater than the width of the spacer rings 60. Each of the spacer rings 60 and ring spacers 80 are alternately positioned on the shafts 50 and 54 so that a scissor ring 60 on one scissor roll opposes a corresponding ring spacer 80 on the other scissor roll creating a circular inter-roll cavity 86 (FIG. 11) between the adjacent rings and outward of the intermediate ring spacers 80. Once the material 12 is cut and sheared, it is received in the inter-roll cavity 86 and passes between the rolls 42 and 44 into the outtake manifold 48.

The axes 52 and 56 of the rolls are sufficiently spaced so that there is a slight overlap of approximately ⅛ inch in the profile of the scissor rings so that as they are rotated, the material is sheared by the shearing edges 68 and the knife fingers 70 as the profile of the scissor rings 60 move into the circular inter-roll cavity 86 of the opposing ring spacer 80.

Figure 6:
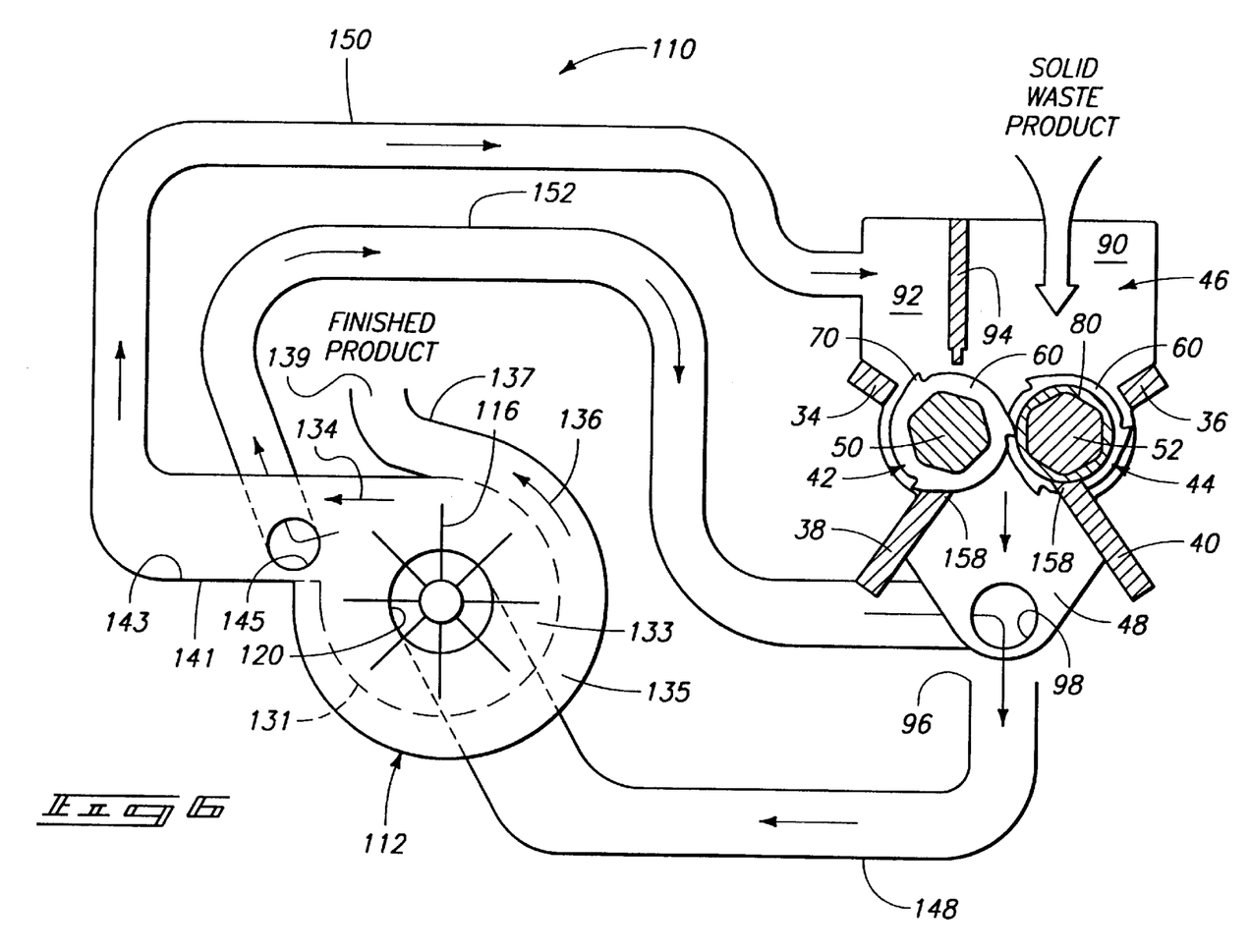
FIG. 6 is a product flow illustrative diagram showing the flow path of the waste material through the apparatus as the material is being progressively process and reduced to the desired particulate size.

The intake manifold 46 has an entrance intake manifold section 90 and a recycle intake manifold section 92 illustrated in FIGS. 3 and 6. The sections 90 and 92 are separated by a divider 94. New solid waste material 12 enters through the entrance 32 into the entrance intake manifold section 90 and subdivided material requiring additional recycling is circulated back into the intake manifold section 92.

The outtake manifold 48 includes an outlet 96 (FIGS. 4 and 6) and an airstream recirculation inlet 98 to facilitate the removal of the severed pieces from the outtake manifold 48 and to entrain such pieces 14 in an airstream.

The apparatus includes a scissor roll drive generally designated with the numeral 100 illustrated in FIGS. 1, 2 and 4 having a motor 102 connected to a speed reduction gear box 104. The box 104 is operatively connected to the shafts 50 and 54 for rotating the shafts counter to each other in the directions illustrated in FIGS. 3, 7 and 8.

The apparatus 10 further includes a pneumatic conveyor generally designated with the numeral 110 for conveying the subdivided pieces 14 from the outtake manifold 48 and directing the pieces to a separator screen 131 to impinge the subdivided pieces against the screen 131 to direct small subdivided pieces 14e through the screen and to carry large subdivided pieces 14a–14d away from the screen 131 and return the large pieces 14a–14d back to the shear intake manifold 46 to further reduce the size of the large subdivided pieces.

The pneumatic conveyor 110 includes a centrifugal fan 112 for generating an airstream of sufficient velocity and volume to remove the subdivided pieces from the shear outtake manifold 48 and to entrain the pieces 14a–14e in the airstream. The centrifugal fan 112, illustrated in FIGS. 9 and 10, includes a housing 114 having a central propeller section 116 and a peripheral volute section 118. The central propeller section 116 includes a central inlet 120 with a propeller assembly 122 mounted within the central propeller section 116. The propeller assembly 122 includes a shaft 124 with radial blades 126 extending radially outward for directing the air from the central inlet 120 radially outward and tangential into the peripheral volute section 118. A motor 128 is connected to the shaft 124 for rotating the blades 126 at the desired speed to obtain an airstream having the desired velocity and volume.

Figure 9:
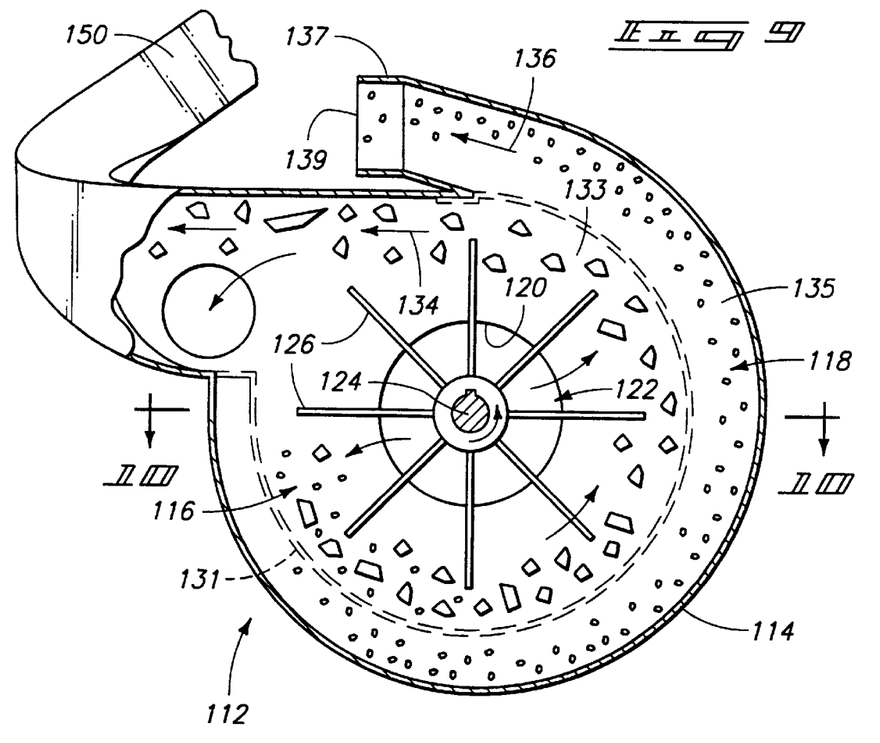
FIG. 9 is a vertical cross-sectional view taken along line 9—9 in FIG. 2.
Figure 10:
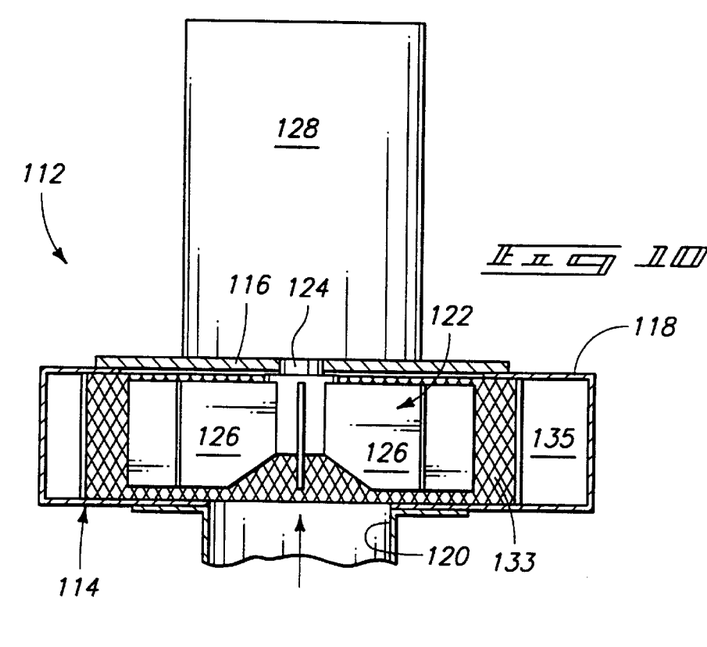
FIG. 10 is horizontal cross-sectional view taken along line 10—10 in FIG. 9.

The separator screen 131 is mounted within the centrifugal fan housing 114 as illustrated in FIGS. 6, 9 and 10. The separator screen 131 is formed in an arcuate shape, and is mounted in the peripheral volute section 118 subdividing the section 118 into an inner volute chamber 133 and an outer volute chamber 135. The path of the airstream in the inner volute chamber 133 is illustrated by the path arrow 134. The path of the airstream in the outer volute chamber 135 is illustrated by the path arrow 136.

The centrifugal fan 112 has an outer volute duct 137 with a product outlet 139 for discharging the small particles 14e that have passed through the separator screen 131 from the centrifugal fan 112. Additionally, the centrifugal fan 112 has a recycle outlet 143 associated with the inner volute 133 for discharging the larger subdivided pieces 14a–14d that do not pass through the screen 131. The inner volute chamber 133 has an inner volute duct 141 that is substantially tangent to the path of the blades 126 for directing a portion of the airstream from the fan through the recycle outlet 143. As previously mentioned, the blades 125 when rotated direct the air and the entrained subdivided pieces radially outward from the central inlet 120 to impinge against the screen 131 in a radial and tangential direction with the small pieces 14e passing through the screen 131 and the large pieces 14a–14d being deflected from the screen and carried by a portion of the airstream from the fan out through the inner volute duct 141.

The inner volute duct 141 includes a recycle outlet 143 for discharging a portion of the airstream containing the entrained large pieces that do not pass through the separator screen 131.

A recirculation outlet 145 is formed in the inner volute duct 141, but angularly spaced from the recycle outlet 143 a sufficient distance so that a additional airstream discharge path is created containing a minimum of the large pieces 14a–14d. The recycle outlet 143 taps a portion of the airstream from the duct 141 at a sharp angle to the normal flow of the airstream and entrained large pieces so that the momentum of the entrained large pieces continue in their normal direction out the recycle outlet 143.

The pneumatic conveyor 110, besides the fan 112, further includes a removal conduit 148 extending between the outlet 96 of the outtake manifold 48 and the central inlet 120 of the centrifugal fan 112 as illustrated in FIGS. 4 and 6. The pneumatic conveyor 110 includes a recycle conduit 150 that extends between the recycle outlet 143 of the fan housing 114 and the recycle intake manifold section 92 (FIGS. 1, 2 and 6). A recirculation conduit 152 extends between the recirculation outlet 145 of the fan housing 114 and the airstream recirculation inlet 98 of the outtake manifold 48 illustrated in FIGS. 4 and 6.

As illustrated in FIGS. 3 and 6, the cross-frame members 38 and 40 have notched stripping fingers 158 formed on an edge thereof projecting between the scissor rings 60 and into the inter-roll cavities 86 along the lower profile of the scissor rolls 42 and 44 to strip any of the subdivided pieces from between the scissor rings 60 after the pieces have been severed.

During the operation of the apparatus 10, solid waste material 12 is fed into the apparatus 10 through the material entrance 32 and into the intake manifold 46 where it is directed to the scissor rolls 42 and 44. As the material engages the rolls, it is gripped by the finger knives 70 and pulled between the scissor rolls 42 and 44 with the scissor rings 60 and its shearing edges 68 shearing the solid waste material into subdivided pieces. As previously mentioned, the finger knives 70 grip the material, puncture the material and transversely cut the material as it passes between the rolls. The severed pieces 14a–14e then descend into the output manifold 48. The stripper fingers 158 strip any severed pieces from the rolls 42, 44 and into the outtake manifold 48.

The airstream created by the centrifugal fan 112 is directed through the outtake manifold 48 from the inlet 98 and the outlet 96 to entrain the subdivided pieces 14a–14e into the airstream which is directed by the removal conduit 148 to the propeller assembly 122 of the centrifugal fan 112. The blades 126 direct the airstream and the entrained subdivided pieces 14a–14e radially and tangentially outward against the arcuate separator screen 131 to cause those pieces 14e that are less than a predetermined size to pass through the screen into the outer volute chamber 136. Those subdivided pieces that are larger than the apertures or holes in the separator screen 131 are carried along the inside of the screen in the inner volute chamber 133 and out the inner volute duct 141 (FIG. 6). The recycle conduit 150 directs the airstream with the entrained large subdivided pieces into the recycle intake manifold section 92 for reprocessing and reduction through another pass of the scissor rolls 42 and 44.

A portion of the airflow is syphoned off through the recirculation outlet 145 and is recirculated back through the recirculation inlet 98 into the output manifold 48. The small pieces 14e that pass through the separator screen 131 are directed from the apparatus through the product outlet 139.

The large particles or pieces 14a–14d will be continually recycled until their size is reduced below that of the preselected size of the apertures of the separator screen 131.

It should be noted that the apparatus 10 is designed to operate at a very low speed with the scissor rolls 42 and 44 rotating at less than 60 rpm. Should any foreign material enter into the apparatus, it will not damage the equipment as the scissor rolls can, if jammed, stop the motor 102 without damaging the rolls particularly the shearing edges 68.

It should be also noted that the machine operates very quietly, even though substantial shearing action is taking place. For many applications, the apparatus is sufficiently quiet, which does not require operator's to wear noise reduction ear-protecting devices when standing nearby.

We claim:

1. An improved apparatus for comminuting solid waste material into small pieces having a size less that a predetermined size, comprising:

a frame having an enclosure with an entrance for initially receiving the solid waste material;

a set of overlapping scissor rolls rotatably mounted within the enclosure for shearing the waste material into subdivided pieces when the material passes between the scissor rolls;

said enclosure having, (1) a shear intake manifold communicating with the entrance for receiving the solid waste material upstream of the scissor rolls and directing the waste material to the scissor rolls, and (2) a shear outtake manifold downstream of the scissor rolls for receiving the subdivided waste material pieces from the scissor rolls after the material has passed between the scissor rolls;

a separator screen mounted on the frame downstream of the scissor rolls having a plurality of apertures corresponding to the predetermined size for permitting small subdivided pieces having a size less than the predetermined size to pass therethrough while preventing large subdivided pieces having a size greater than the predetermined size from passing therethrough; and a pneumatic conveyer mounted on the frame communicating with the shear outtake manifold, the screen, and the shear intake manifold for generating an airstream of sufficient velocity to (1) remove the subdivided pieces from the shear outtake manifold, (2) entrain the subdivided pieces in the airstream, (3) impinge the subdivided pieces against the screen to direct the small subdivided pieces through the screen, and (4) carrying the large subdivided pieces away from the screen and into the shear intake manifold to recycle the large subdivided pieces through the scissor rolls to further reduce the size of the large subdivided pieces.

2. The solid waste comminuting apparatus as defined in claim 1 wherein the pneumatic conveyer includes:

a fan for generating the airstream;

a first airstream conduit to direct the airstream with entrained subdivided pieces from the shear outtake manifold to the separating screen;

a second airstream conduit to direct a first portion of the airstream from the screen to the shear input manifold to recycle the large subdivided pieces back to the scissor shear rolls;

a third airstream conduit to direct a second portion of the airstream from the apparatus to discharge the small pieces from the apparatus.

3. The solid waste comminuting apparatus as defined in claim 2 wherein the pneumatic conveyer further includes a fourth airstream conduit to receive a third portion of the airstream and recirculate the third portion from the screen to the shear outtake manifold to increase the volume of air passing though the shear outtake manifold to facilitate the entrainment of the subdivided pieces in the airstream and removal of the subdivided pieces from the shear outtake manifold.

4. The solid waste comminuting apparatus as defined in claim 3 wherein the fan has (1) fan blades positioned upstream of the screen, and (2) an inlet operatively communicating with the first airstream conduit.

5. The solid waste comminuting apparatus as defined in claim 3 wherein the fan has an outlet duct operatively communicating with the fourth airstream conduit to recirculate the third portion of the airstream back to the outtake manifold.

6. The solid waste comminuting apparatus as defined in claim 2 wherein the fan includes:

an inlet operatively connected to the first airstream conduit;

a first outlet operatively connected to the second airstream conduit;

a second outlet operatively connected to the third airstream conduit; and a fan blade assembly positioned between the inlet and the second and third outlets for generating the airstream of the sufficient velocity; and wherein the screen is positioned between the fan blade assembly and the second outlet to separate the small pieces and the large pieces.

7. The solid waste comminuting apparatus as defined in claim 1 wherein the pneumatic conveyer includes a centrifugal fan having a fan housing having (1) a central propeller section with a central inlet operatively communicating with the shear outtake manifold, and (2) a peripheral volute section; and wherein the separator screen is arcuate shaped and is mounted in the peripheral volute section of the fan housing subdividing the volute section into an inner volute chamber and an outer volute chamber; and wherein the fan further includes an impeller mounted in the propeller section for pulling the airstream through the central inlet and forcing the airstream radially outward and tangentially into the peripheral volute section to impinge the subdivided pieces against the arcuate screen with the small pieces passing through the screen into the outer volute chamber and the large pieces remaining in the inner volute chamber.

8. The solid waste comminuting apparatus as defined in claim 7 wherein the fan housing further includes (1) a first outlet associated with the inner volute chamber and operatively connected to the shear intake manifold for directing a first portion of the airstream having entrained large pieces from the fan to recycle the large pieces back to the scissor shear rolls, and (2) a second outlet associated with the outer volute chamber for directing a second portion of the airstream with the small pieces from the fan.

9. The solid waste comminuting apparatus as defined in claim 8 wherein the fan housing further includes a third outlet associated with the inner volute chamber for directing a third portion of the airstream from the fan, and wherein the pneumatic conveyor includes a recirculation conduit extending between the third outlet and the outtake manifold to recirculate a third portion of the airstream from the fan to the outtake manifold to increase the volume of air passing through the outtake manifold to facilitate entrainment of the subdivided pieces into the airstream and removal of the subdivided pieces from the outtake manifold.

10. The solid waste comminuting apparatus as defined in claim 9 wherein the third outlet is angularly displace a sufficient distance from the first outlet to minimize passage of the large pieces through the third outlet and into the third portion of the airstream.

11. The solid waste comminuting apparatus as defined in claim 1 wherein each of the scissor rolls includes a plurality of intermeshing scissor rings interspaced by sleeve spacers that are correspondingly offset to permit peripheral shearing edges of the scissor rings of one scissor roll to overlap peripheral shearing edges of the other scissor roll to shear the material as the material passes between the overlapping peripheral shearing edges;

wherein at least a majority of the scissor rings have integral finger knives extending radially outward from the peripheral shearing edges to grip, puncture and transversely cut the material as the material passes between the scissor rolls.

12. The solid waste comminuting apparatus as defined in claim 11 wherein each of the finger knives project radially outward and tangentially forward in the direction of rotation of the rolls to efficiently grip, puncture and transversely sever the material as the material passes through the scissor rolls.

13. An improved apparatus for comminuting solid waste material into small pieces having a size less that a predetermined size, comprising:

a frame having an enclosure with an entrance for initially receiving the solid waste material;

a set of overlapping scissor rolls rotatably mounted within the enclosure for shearing the waste material into subdivided pieces when the material passes between the scissor rolls;

said enclosure having, (1) a shear intake manifold communicating with the entrance for receiving the solid waste material upstream of the scissor rolls and directing the waste material to the scissor rolls, and (2) a shear outtake manifold downstream of the scissor rolls for receiving the subdivided waste material pieces from the scissor rolls after the material has passed between the scissor rolls;

a centrifugal fan for generating an airstream for conveying the subdivided pieces, in which the fan has (1) a central propeller section with a central inlet operatively communicating with the shear outtake manifold, and (2) a peripheral volute section; and a separator screen mounted in the peripheral volute section of the fan housing subdividing the volute section into an inner volute chamber and an outer volute chamber, in which the separator screen has a plurality of apertures corresponding to the predetermined size for permitting small subdivided pieces having a size less than the predetermined size to pass therethrough while preventing large subdivided pieces having a size greater than the predetermined size from passing therethrough;

wherein the fan housing further includes (1) a first outlet associated with the inner volute chamber, and (2) a second outlet associated with the outer volute chamber;

a first airstream conduit extending between the outtake manifold and the fan inlet for directing the airstream with entrained subdivided pieces from the shear outtake manifold to the fan;

a second airstream conduit extending between the first fan outlet and the shear intake manifold for directing a first portion of the airstream from the inner volute chamber to the shear intake manifold to recycle the large subdivided pieces back to the scissor shear rolls;

a third airstream conduit operatively connected to the second fan out for directing a second portion of the airstream from the outer volute chamber to discharge the small pieces from the apparatus; and wherein the fan further includes an impeller mounted in the propeller section for pulling the airstream through the central inlet and forcing the airstream radially outward and tangentially into the peripheral volute section with sufficient velocity to (1) remove the subdivided pieces from the shear outtake manifold through the first conduit, (2) entrain the subdivided pieces in the airstream, (3) impinge the subdivided pieces against the screen to direct the small subdivided pieces through the screen and into the outer volute chamber, and (4) carrying the large subdivided pieces from the inner volute chamber through the second conduit in the shear intake manifold to recycle the large subdivided pieces through the scissor rolls to further reduce the size of the large subdivided pieces.

14. The solid waste comminuting apparatus as defined in claim 13 wherein the fan housing has a third outlet associated with the inner volute chamber for discharging a third portion of the airstream from the fan, and wherein the apparatus further includes a fourth conduit extending between the third fan outlet to the outtake manifold to recirculate the third portion of the airstream back to the outtake manifold to facilitate entrainment of the subdivided pieces in the airstream and removal of the entrained pieces from the outtake manifold.

15. The solid waste comminuting apparatus as defined in claim 14 wherein the third fan outlet is sufficiently angularly displaced from the first fan outlet to minimize entrainment of the large pieces in the third portion of the airstream.

16. An improved apparatus for comminuting solid waste material into small pieces having a size less that a predetermined size, comprising:

a frame having an enclosure with an entrance for initially receiving the solid waste material;

a set of overlapping scissor rolls rotatably mounted within the enclosure for shearing the waste material into subdivided pieces when the material passes between the scissor rolls;

said enclosure having, (1) a shear intake manifold communicating with the entrance for receiving the solid waste material upstream of the scissor rolls and directing the waste material to the scissor rolls, and (2) a shear outtake manifold downstream of the scissor rolls for receiving the subdivided waste material pieces from the scissor rolls after the material has passed between the scissor rolls;

a separator screen mounted on the frame downstream of the scissor rolls having a plurality of apertures corresponding to the predetermined size for permitting small subdivided pieces having a size less than the predetermined size to pass therethrough while preventing large subdivided pieces having a size greater than the predetermined size from passing therethrough; and a conveyer mounted on the frame communicating with the shear outtake manifold, the screen, and the shear intake manifold to (1) remove the subdivided pieces from the shear outtake manifold, (2) direct the subdivided pieces against the screen to pass the small subdivided pieces through the screen, and (4) carrying the large subdivided pieces away from the screen and into the shear intake manifold to recycle the large subdivided pieces through the scissor rolls to further reduce the size of the large subdivided pieces;

wherein each of the scissor rolls includes a plurality of intermeshing scissor rings interspaced by sleeve spacers that are correspondingly offset to permit peripheral shearing edges of the scissor rings of one scissor roll to overlap peripheral shearing edges of the other scissor roll to shear the material as the material passes between the overlapping peripheral shearing edges;

wherein at least a majority of the scissor rings have integral finger knives extending radially outward from the peripheral shearing edges to grip, puncture and transversely cut the material as the material passes between the scissor rolls.

17. The solid waste comminuting apparatus as defined in claim 16 wherein each of the finger knives project radially outward and tangentially forward in the direction of rotation of the rolls to efficiently grip, puncture and transversely sever the material as the material passes through the scissor rolls.

* * * * *

UNITED STATES PATENT AND TRADEMARK OFFICE
CERTIFICATE OF CORRECTION

PATENT NO. : 5,836,527
DATED : November 17, 1998
INVENTOR(S) : Jere F. Irwin and Gerald M. Corbin It is certified that error appears in the above-identified patent and that said Letters Patent is hereby corrected as shown below:

Col. 1, line 12, after "waste material", delete "is" and insert --are--.

Col. 1, line 27, delete "hammermill", and insert --hammermills--.

Col. 1, line 59, delete "of the material", and insert --as the material--.

Col. 2, line 6, after "Fig. 10 is", insert --a--.

Col. 2, line 8, after "Fig. 11 is", insert --a--.

Col. 2, line 54, delete "between the scissors", and insert --between the scissor--.

Col. 2, line 55, delete "scissors rolls 42", and insert --scissor rolls 42--.

Col. 3, line 45, delete "move into", and insert --moves into--.

Col. 4, line 43, delete "blades 125", and insert --blades 126--.

UNITED STATES PATENT AND TRADEMARK OFFICE
CERTIFICATE OF CORRECTION

PATENT NO. : 5,836,527
DATED : November 17, 1998
INVENTOR(S) : Jere F. Irwin and Gerald M. Corbin It is certified that error appears in the above-identified patent and that said Letters Patent is hereby corrected as shown below:

Col. 4, line 57, delete "so that a", and insert --so that an--.

Col. 4, line 62, delete "continue in their", and insert --continues in its--.

Col. 5, line 62, delete "operator's", and insert --operators--.

In the Claims:

Col. 5, line 66, delete "less that", and insert --less than--.

Col. 7, line 53, delete "displace", and insert --displaced--.

Col. 8, line 10, delete "less that", and insert --less than--.

Col. 9, line 22, delete "less that", and insert --less than--.

UNITED STATES PATENT AND TRADEMARK OFFICE
CERTIFICATE OF CORRECTION

PATENT NO. : 5,836,527
DATED : November 17, 1998
INVENTOR(S) : Jere F. Irwin and Gerald M. Corbin It is certified that error appears in the above-identified patent and that said Letters Patent is hereby corrected as shown below:

In the Drawings:

In Figure 3, delete reference numeral "170", and insert --70--.

In Figure 11, delete reference numeral "170", and insert --70--.

In Figure 11, delete reference numeral "176", and insert --76--.

Signed and Sealed this

Sixth Day of July, 1999

*Attest:*

Q. TODD DICKINSON

*Attesting Officer*    Acting Commissioner of Patents and Trademarks